United States Patent [19]

Blumberg et al.

[11] Patent Number: 4,755,078
[45] Date of Patent: Jul. 5, 1988

[54] SEALING BELLOWS FOR BALL JOINTS

[75] Inventors: Willy Blumberg, Meerbusch; Hans J. Schütt, Aachen; Ulrich Mette, Essen; Karl-Heinz Barbet, Korschenbroich; Fritz Busse, Hilden; Benno Klier, Meerbusch, all of Fed. Rep. of Germany

[73] Assignee: TRW Ehrenreich GmbH & Co KG, Dusseldorf, Fed. Rep. of Germany

[21] Appl. No.: 39,078

[22] Filed: Apr. 16, 1987

[30] Foreign Application Priority Data

Apr. 17, 1986 [DE] Fed. Rep. of Germany ....... 3612913

[51] Int. Cl.$^4$ ............................................. F16C 11/06
[52] U.S. Cl. ..................................... 403/134; 403/50; 277/212 FB; 464/173
[58] Field of Search ............................... 464/173, 175; 277/212 FB; 403/134, 50, 51

[56] References Cited

U.S. PATENT DOCUMENTS

| | | |
|---|---|---|
| 2,264,728 | 12/1941 | Stillwagon et al. |
| 3,052,477 | 9/1962 | Parker .............................. 403/134 X |
| 3,322,445 | 5/1967 | Hassen ............................ 403/134 X |
| 3,391,952 | 7/1968 | Zeigler . |
| 3,578,366 | 5/1971 | Snidar .............................. 403/134 X |
| 3,623,340 | 11/1971 | Maas ................................... 464/175 |
| 3,650,552 | 3/1972 | Schmid . |
| 4,235,427 | 11/1980 | Bialobrzeski ................. 277/212 FB |
| 4,403,781 | 9/1983 | Riemscheid ................... 464/175 X |

FOREIGN PATENT DOCUMENTS

| | | |
|---|---|---|
| 0157559 | 10/1985 | European Pat. Off. . |
| 1286823 | 6/1960 | Fed. Rep. of Germany . |
| 2945234 | 5/1981 | Fed. Rep. of Germany ...... 464/175 |

*Primary Examiner*—Andrew V. Kundrat
*Attorney, Agent, or Firm*—Tarolli, Sundheim & Covell

[57] ABSTRACT

A sealing bellows for closing an opening in a ball joint housing said sealing bellows having axially extending hose sections continuously folded on each other, at least partially overlapping each other, and connected with each other by circumferential, contiguous, inner and outer folds; said hose sections beginning from the hose section attached to said housing having a progressively smaller diameter, and each outward fold having an axial thickening of material that exceeds that of an inner fold and the wall thickness of a hose section; said axial thickening shielding at least partially a hose section connected to the respective outward fold and having a smaller diameter.

9 Claims, 2 Drawing Sheets

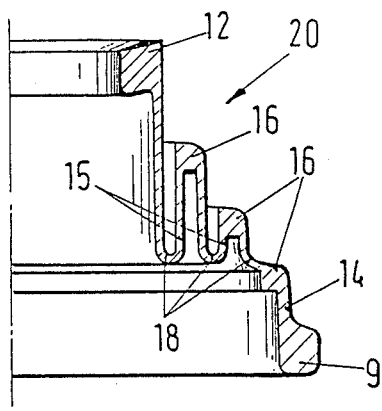
Fig. 4
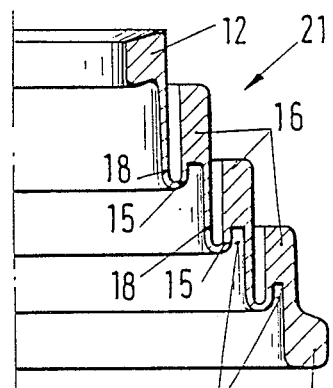
Fig. 5
Fig. 6
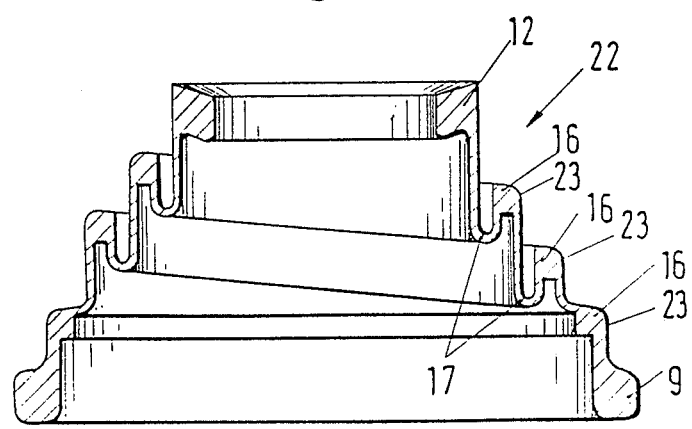

SEALING BELLOWS FOR BALL JOINTS

BACKGROUND OF THE INVENTION

The invention relates to a sealing bellows for a ball joint which closes on opening in a ball joint housing through which a rotatable or pivotal ball stud extends. The sealing bellows is made from an elastomeric material and has a large diameter opening that circumscribes the joint housing and a small diameter opening sealingly engaging the ball stud. The sealing bellows has a plurality of axial hose sections continuously folded one into the other and at least partly overlapping each other. The hose sections are joined with each other by circumferential folds and have a progressively decreasing diameter beginning from the nonfolded hose section fastened to the joint housing.

U.S. Pat. No. 2,264,728 discloses a hose type sealing bellows for a universal joint or the like and having openings for attachment to the joint parts pivotal relative to each other. The sealing bellows has radially extending hose sections joined by folds extending radially inward and radially outward. The folds may be thickened.

This previously known sealing bellows has the disadvantage of having a large construction volume because of its radially extending folds. This construction volume is considerably further increased in the radial direction when the sealing bellows is deformed by an angular position of the joint parts. In this case, the thickening on the folds causes the sealing bellows to bend outwardly at the location of the thickening so as not to touch the universal joint. Therefore, the hose sections are insufficiently protected against mechanical damage. Namely, on the outer side of the universal joint points, the sealing bellows is considerably spread out, so that the hose sections are practically exposed.

German Published Application No. 1,286,823 discloses an elastomeric sealing bellows for ball joints having a form of an inverted cup having an opening for attachment to a joint housing, and another opening abutting a sealing ring circumscribing the ball stud. This previously known sealing bellows has hose sections folded one onto the other and joined together by circumferential folds. The hose section that surrounds the ball stud extends radially further outside than the other hose sections which are continuously folded thereonto. This succession of hose sections folded one onto the other results in disadvantageously large construction volume of the sealing bellows as the sealing bellows at the fold of the radially outermost hose section, has a much larger diameter than the joint housing to provide sufficient clearance for movement of the folded-in hose sections.

U.S. Pat. No. 3,650,552 discloses a ball joint with an elastomeric sealing bellows having three cylindrical hose sections of which the outermost hose section is connected by an arched outwardly fold, with a first folded-in hose section which, in turn, is connected by an arched inwardly fold, with a second folded-in hose section. This previously known sealing bellows is not protected from mechanical damage, so that, for example, when used in steering rods of motor vehicles, it can be damaged by whirling solids. Moreover, its form stability is not especially good, since its folds and hose sections can be displaced with a rotary or angular movement, and the build-up of a return force is also prevented by an early breaking of the folds. Consequently, this known sealing bellows, at its ball stud side opening, is guided on both sides in a groove so that it regains approximately its original form when the ball stud occupies its intermediate position. Finally, the space required for this sealing bellows is large since the outermost hose section is subjected to large deformations.

European Patent No. 0 157 559 discloses a sealing bellows for joint connections having a hose-form body made from a flexible material and fastened at the end openings thereof to the joint parts with at least one hose section being folded onto an adjacent hose section. This sealing bellows has essentially the same disadvantages that the sealing bellows for ball joints described above.

The object of the invention is a sealing bellows which is better protected against mechanical damage, is more form-stable, but which has sufficient softness and a large deflection range and, at the same time, even with great deflection angles of the ball stud, requires little space.

SUMMARY OF THE INVENTION

The object of the invention is achieved by providing a sealing bellows in which each axial outward fold has a material thickness or thickening greater than that of a hose section and an axial inward fold.

The essential idea of the invention consists, therefore, in reinforcing the folds extending axially outward so that they are not damaged by solids striking against them and protect the adjoining hose sections. These thickened folds also increase the form stability of the sealing bellows, as the resiliency increases as the ball stud moves from its original position. At the same time, the hose sections and the folds extending axially inward give the sealing bellows sufficient softness and elasticity so that a large deflection and rotational angles of the ball stud are possible with the sealing bellows always returning to its original form. By thickening of material, breaking and an associated increase of stresses in the sealing bellows are prevented. Moreover, the slight deformability of the folds extending axially outward results in that the sealing bellows, even with great deflection movement of the ball stud, needs little space and practically no projection of the sealing bellows beyond the maximum diameter of the joint housing takes place.

The thickening of material might also be achieved by using clamped strips on the outside of the folds. In one preferred embodiment, the material thickening is effected integral with the folds extending axially outward and the material partially fills the gaps between the hose sections. Thus, the material thickening can be effected during the manufacture of the sealing bellows.

In another embodiment, the folds extending axially outward have an outer rounding so that solids with different striking angles are hurled back.

In another embodiment, the hose section arranged radially outward have larger wall thickness than the hose sections folded in, so that, on one hand, it is protected from damage and, on the other hand, it has practically no side deflection. Therefore, the space requirement for the sealing bellows is additionally reduced because the folded-in hose sections can be supported against the hose section extending radially outward.

In another embodiment, the folds extending axially outward are staged along the axis of the ball stud with the folds having smaller diameters located farther away from the axis. In this way, it is achieved that the outer surface of the sealing bellows according to the invention is substantially covered by the folds extending axially outward and an especially high resistance to striking solids results. Moreover, the folds extending axially outward do not appreciably hinder the deflection of the ball stud and the folded-in hose sections may be of such size that they have sufficient softness.

In another embodiment, a fold extending axially outward is wound in spiral form around the stud axis. This results in a very soft bellows.

A further increase in rotational softness is attained if the hose sections are waved in sinusoidal form. The corrugation may extend in a circumferential and/or in stud axis directions.

BRIEF DESCRIPTION OF THE DRAWINGS

Other details and advantages of the subject invention will become apparent from the description which follows with reference to respective drawings which show preferred embodiments of a sealing bellows according to the invention.

In the drawings:

FIG. 4 shows a cross-section of a half of a sealing bellows with elongated hose sections according to a second embodiment of the present invention;

FIG. 5 shows a cross-section of a half of a sealing bellows with enlarged material thickening according to a third embodiment of the present invention;

FIG. 6 shows a cross-section of a sealing bellows having a spiral-form fold according to a fourth embodiment of the present invention.

DESCRIPTION OF THE PREFERRED EMBODIMENTS

Figure 1:
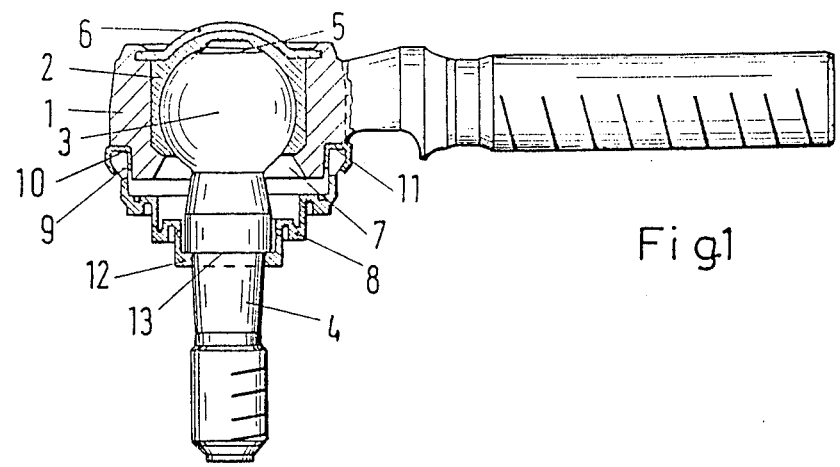
FIG. 1 shows a partial cross-section of a ball joint with a sealing bellows according to a first embodiment of the invention.
Figure 2:
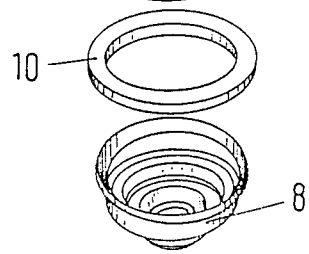
FIG. 2 shows a perspective view of the same ball joint with the same sealing bellows.

FIGS. 1 and 2 show a ball joint comprising a joint housing 1 in which a bearing member 2 is located. The bearing member supports a ball head 3 of a rotatable or pivotal ball stud 4. Near the pole cap of the ball head 3, the bearing member 2 is provided with a grease reservoir 5. The bearing member 2 is held in the joint housing 1 by a rolled-in housing cover 6.

The joint housing 1 has an opening through which the ball stud 4 extends and which is closed by a sealing bellows 8 to prevent entrance of impurities into the ball joint and exit of the grease. The sealing bellows 8 has a rim 9 which surrounds the joint housing and is held by a retaining ring 10 on an outer circumferential shoulder 11 of the joint housing 1. On the stud side, the sealing bellows 8 is provided with a sealing ring 12 which sealingly engages the ball stud and is supported by a shoulder 13 thereof. The ball stud 4 is rotatable in the sealing ring 12.

The sealing bellows 8 according to the invention is simple to mount, especially since no fastening means on the ball stud 4 are necessary. But fastening means might be provided there, especially in order to improve the sealing, because the sealing bellows also has a sufficient torsion elasticity.

Figure 3:
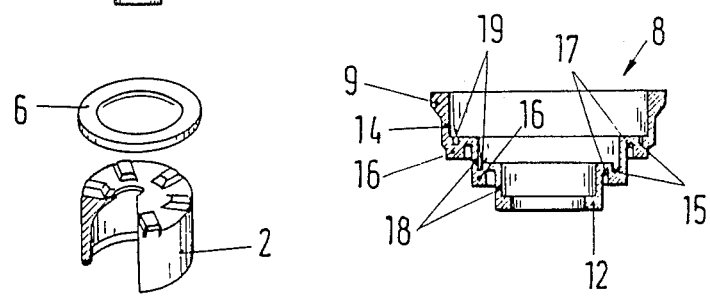
FIG. 3 shows the cross-section of the sealing bellows of FIG. 1.
Figure 3:
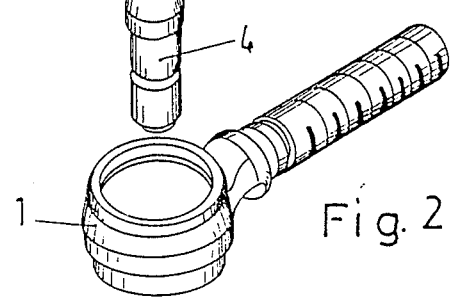

Details of the sealing bellows 8 according to the invention may be seen better from FIG. 3. A side bellows rim 9 circumscribes the joint housing. A hose section 14 extends from the rim 9. From this radially outward hose section 14 extends other folded hose sections, of which a first folded-in hose section 15 is connected with the outer hose section 14 by an axially outward fold 16. A fold 17 directed radially inward connects the inward folded hose section 15 with another inward-folded hose section 18. To these hose sections are joined by other folds hose sections corresponding to those marked with reference numbers 15 to 18, until, finally, instead of an axial outward fold, a sealing ring 12 is provided.

The axially outward folds 16 of the sealing bellows 8 have a thickening of material thereon which partially fill gaps 19 between the hose sections. The radially outer hose section 14 has a greater wall thickness than the folded-in hose sections 15, 18. By staging the axially outward folds 16 along the stud axis so that the folds having smaller diameters are located axially farther away from the rim 9, the sealing bellows is made soft and mobile.

In the sealing bellows described below, elements having the same function that those described above have the same reference numerals. By dimensioning the folded-in hose sections 15, 18 and by selecting their number, the softness and form stability of the sealing bellows and the maximum possible deflection angle of the ball stud can be modified.

FIG. 4 shows a sealing bellows 20 with staged axially outward folds 16 and in which the length of the folded-in hose sections 15, 18 increases with decreasing of the diameters thereof, thus the inner volume of the sealing bellows 8 is used optimally.

FIG. 5 shows a sealing bellows 21 in which the thickening of material on the staged folds 16 fill out the gaps 19 so that the thickening of material completely covers the sides of the folded-in hose sections 15, 18.

FIG. 6 shows a sealing bellows 22 in which the axially outward folds 16 are wound in spiral form around the stud axis and the folds 16 having smaller diameter are arranged axially farther away from the rim. The axially inward folds 17 are also correspondingly wound in spiral form around the stud axis. The folds 16 have an outside rounding 23.

The sealing bellows may be made from an elastomeric material, for example, from a polyurethane.

We claim:

1. A sealing bellows for closing an opening in a ball joint housing through which a rotatable or pivotable ball stud extends, said sealing bellows being made of an elastomeric material and having a large diameter opening engaging said housing and a small diameter opening engaging said stud, said sealing bellows comprising axially extending hose sections continuously folded on each other, at least partially overlapping each other, and connected with each other by circumferential, contiguous, inner and outer folds; said hose sections beginning from the hose section attached to said housing having a progressively smaller diameter, and each outward fold having an axial thickening of material that exceeds that of an inner fold and the wall thickness of a hose section; said axial thickening shielding at least partially a hose section connected to the respective outward fold and having a smaller diameter.

2. A sealing bellows according to claim 1 wherein the material thickening is integral with the axial outward fold and partially fills a gap between the hose sections.

3. A sealing bellows according to one of claims 1 and 2 wherein the axial outward folds have an outer rounding.

4. A sealing bellows according one of claims 1 or 2 wherein one axial outward fold is spirally wound around the stud axis.

5. A sealing bellows according to one of claims 1 or 2 wherein the hose sections are corrugated in a sinusoidal form.

6. A sealing bellows according to claim 1 or 2 wherein the hose section attached to the housing has a greater wall thickness than the hose section located inward thereof.

7. A sealing bellows according to claim 1 or 2 wherein the outward folds are staged along the stud axis with folds having a smaller diameter located axially further away from the large diameter opening.

8. A sealing bellows for closing an opening in a joint housing through which a rotatable or pivotal ball stud extends, said sealing bellows being made of an elastomeric material and having spaced large and small diameter openings for sealingly engaging the housing and the ball stud, respectively; said sealing bellows comprising a plurality of axially extending and at least partially overlapping hose sections extending from the large diameter opening to the small diameter opening, the hose sections comprising an axially extending main portion having progressively decreased diameters, and circumferential fold means for connecting the main portions of adjacent hose sections; said circumferential fold means comprising contiguous inward and outward folds, each of the outward folds having an axial thickness which exceeds that of an inward fold and the wall thickness of the main portion of a hose section and shields at least partially the main portion of an adjacent hose section having a smaller diameter.

9. A sealing bellows according to claim 8 wherein the outward axial folds having the axial thickness shields a substantial axial length of the main portion of the adjacent hose section of smaller diameter.

* * * * *